United States Patent
Kitai et al.

[11] 3,864,713
[45] Feb. 4, 1975

[54] FOCAL PLANE SHUTTER BLADE SUPPORT DEVICE

[75] Inventors: Kiyoshi Kitai, Tokyo; Eiichi Onda, Misato; Mitsuo Koyama; Tadashi Nakagawa, both of Yotsukaido, all of Japan

[73] Assignee: Seiko Koki Kabushiki Kaisha, Tokyo, Japan

[22] Filed: May 8, 1973

[21] Appl. No.: 358,261

[30] Foreign Application Priority Data
May 8, 1972 Japan............................. 47-053480

[52] U.S. Cl.................. 354/246, 354/250, 354/255
[51] Int. Cl........................... G03b 9/42, G03b 9/16
[58] Field of Search .......... 95/53 R, 55, 58, 59, 60; 354/246, 250, 255

[56] References Cited
UNITED STATES PATENTS

| | | | |
|---|---|---|---|
| 2,975,689 | 3/1961 | Chatani | 95/55 |
| 3,580,156 | 5/1971 | Loseries | 95/60 |
| 3,628,438 | 12/1971 | Loseries | 95/59 |
| 3,683,778 | 8/1972 | Weiss | 95/60 |

Primary Examiner—John M. Horan
Assistant Examiner—Russell E. Adams, Jr.
Attorney, Agent, or Firm—Robert E. Burns; Emmanuel J. Lobato; Bruce L. Adams

[57] ABSTRACT

A focal plane shutter blade arrangement in which two separate groups of shutter blades are independently mounted and operated in parallel relationships for opening and closing the shutter aperture. Each of the two shutter blade groups has a parallel link mechanism including shutter blades of the respective groups for operating the shutter blades. Each shutter blade group has a slit-forming shutter blade. One of these slit-forming blades has a straight trailing edge and the other a straight leading edge for forming an accurate slit uniformly as the shutter aperture is opened and closed. A baseboard pivotally supporting the two parallel link mechanisms and shutter blades has a single arcuate slot in which pins mounted on slit-forming blades and the parallel links are guided for maintaining the slit-forming blades accurately during travel to maintain their respective straight edges defining uniformly varying slits as the shutter aperture is opened and closed.

3 Claims, 2 Drawing Figures

FOCAL PLANE SHUTTER BLADE SUPPORT DEVICE

BACKGROUND OF THE INVENTION

This invention relates generally to focal plane shutters and more particularly to a shutter blade arrangement and support device therefor.

The use of focal plane shutters in which the shutter blades are divided into two groups are known. One group is used for opening the shutter and the other closes it. When the shutter is in a cocked condition, the shutter-opening group of shutter blades closes the shutter aperture and the shutter blades of the shutter-closing group are in a superposed condition. These known types of focal plane shutter blade arrangements are arranged in two groups in order to attempt to reduce the size of this type of the shutter. The shutters use two sets of parallel levers for mounting the blades with a respective set of parallel levers for pivotally mounting each group by pivotally mounting one end of a principal lever with the levers of the two groups pivotally mounted on one side of the exposure aperture.

SUMMARY OF THE INVENTION

It is a principal object of the present invention to provide a new and improved compact shutter blade arrangement and support device for a focal plane shutter.

In the focal plane shutter according to the invention, support means comprising a baseboard is provided with a shutter aperture. A first and a second plurality or group of shutter blades are arranged as shutter-opening blades in one group and shutter-closing blades in the second group. Each group of blades is pivotally mounted on two parallel links mounted on a principal link or lever with an auxiliary link or lever pivotally connected to the main lever and to the blades.

In order to uniformly develop a uniform slit as the shutter aperture is opened or closed, a slit-forming blade is provided in each shutter blade group in which a straight edge thereof functions to develop a slit aperture uniformly. These two blades and the free ends of the principal levers and auxiliary levers are guided, during travelling movement, by guides in an arcuate slit formed in the baseboard.

BRIEF DESCRIPTION OF THE DRAWINGS

Other objects and advantages of the focal plane shutter blade arrangement according to the invention will appear from the following description of an example of the invention and the novel features will be particularly pointed out in the appended claims and supporting drawings in which:

DESCRIPTION OF THE PREFERRED EMBODIMENTS

Figure 1:
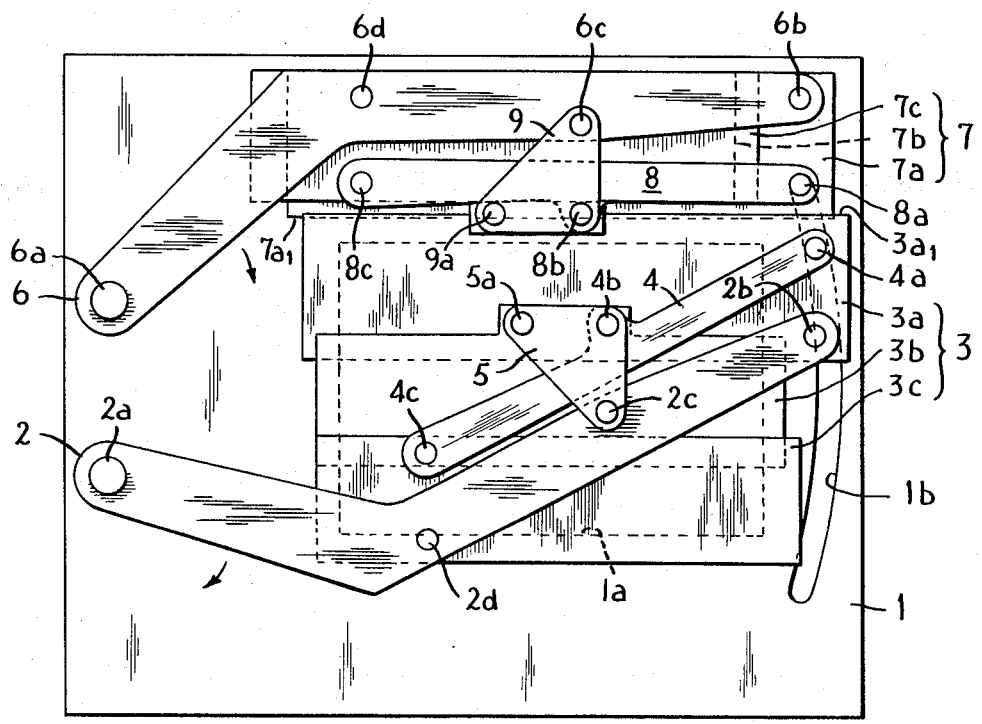
FIG. 1 is a plan view of the shutter blade arrangement, in a cocked condition, of a focal plane shutter according to the invention.

As illustrated in the drawing, a baseboard 1 is provided with a rectangular opening 1a constituting a shutter or exposure aperture and an arcuate groove or slit 1b on one side of the shutter aperture. An L-shaped main parallel lever link or lever 2 of a first link mechanism, hereinafter described, is pivotally mounted on the baseboard by a pivot 2a for pivotally supporting and actuating a plurality or group of shutter-opening blades 3. The link mechanism is provided with a second shorter auxiliary parallel link or lever 4 connected to the main lever by a triangle-shaped plate or member 5.

Figure 2:
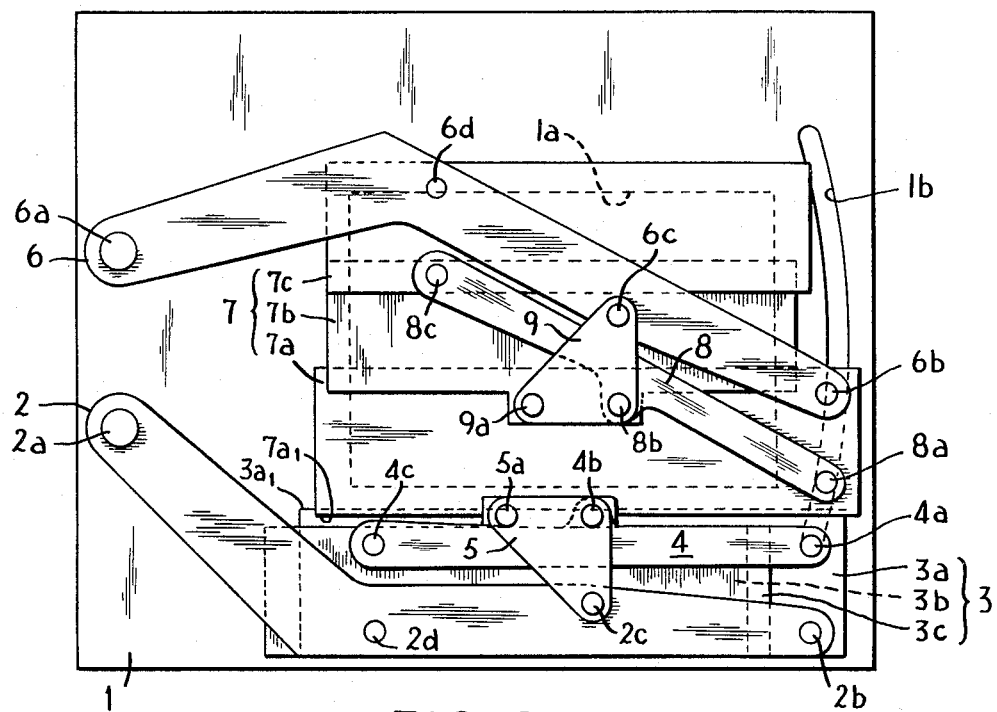
FIG. 2 is a second plan view of the same shutter blade arrangement in FIG. 1 illustrating the shutter subsequently to close thereof subsequent to a photographic exposure.

The shutter-opening group of blades constitutes rectangular shutter blades 3a–3c disposed in a spread position, as illustrated in FIG. 1, when the shutter is in a cocked condition and operable to a superposed position, as illustrated in FIG. 2 when the shutter is closed after the taking of a photographic exposure. The shutter-opening blades comprise a trailing slit-forming blade 3a which is longer than the others and has a straight edge $3a_1$ defining a trailing edge for uniformly and accurately defining a slit as the shutter is opened to develop the shutter aperture.

The main lever 2 is mounted on the pivot 2a on the baseboard 1 and has at a free end thereof a pin 2b pivotally mounting the slit-forming blade 3a thereon adjacent one end and is provided with a second pivot pin 2d on which the third shutter blade 3c is pivoted adjacent its end most remote from the free-end of the main lever.

The auxiliary lever 4 is provided with a pivot pin 4a pivotally mounting thereon the trailing slit-forming shutter blade 3a adjacent one end and has in the middle thereof a second pivot pin 4b on the connector plate 5, pivotally connecting the shutter blade 3b thereto. The auxiliary lever has at an opposite extreme end from the free end a third pivot 4c to which the third shutter-operating blade 3c is pivotally connected. The connector plate 5 is fixedly connected to the shutter blade 3b with the pin 4b and a second connecting pin 5a. The main link 2 is pivotally connected to the connector plate 5 by a pivot pin 2c.

The distance between the pin 4a and 2b, the distance between pins 4b and 2c, and the distance between the pins 4c and 2d are all equal. A straight line connecting the pins 4a and 2b, the straight line connecting the pins 4b and 2c, and a straight line between the pins 4c and 2d are parallel. In other words these three sets of pins are disposed in parallel planes.

The arrangement thereby defines a parallel motion link mechanism with the opening main lever 2, the auxiliary lever 4 and the blades 3a and 3c a link and the pins 2c, 4b, 4c and 2d as a contrapositive point.

The main operating L-shaped lever 2 is operated by a rotation of the pivot 2a by shutter operating mechanism, not shown. The shutter-opening blades are actuated from the position shown in FIG. 1 to that shown in FIG. 2. The pivot pin 4a on the auxiliary lever 4 extends into the arcuate slot 1b so that the straight trailing edge $3a_1$ of the slit-forming shutter blade 3a is held in a plane that advances downwardly on the paper normal to a medial plane passing through the aperture so that a uniform slit is progressively developed as the shutter is opened. As the pin 4a travels in the slot or groove 1b each of the links between the pins 4a and 2b, between the pins 4b and 2c and between the pins 4c and 2d is always perpendicular to the slit-forming edge $3a_1$.

A second L-shaped main link or lever 6 is mounted on a pivot 6a for actuating a plurality of shutter-closing blades 7 constituting a set of three shutter blades 7a–7c. A second shorter link 8 is pivotally connected to the shutter blades and to the main operating lever with a connector plate 9.

The main operating L-shaped lever 6 is provided with a pivot pin 6b on a free end thereof to which the leading shutter blade or slit-forming shutter blade 7a of the group is pivotally connected. A second pivot 6c connects the connector plate 9 thereto and a third pivot pin 6d provides a pivotal connection to the third shutter-closing blade 7c remote from the free end of the lever. The auxiliary link 8 has a pivot pin 8a pivotally connected to the leading shutter blade 7a and a second pin 8b pivotally connecting the auxiliary lever on the connector plate with a third pivot pin 8c, pivotally connected to the shutter blade 7c. A third pin 9a of the connector 9 provides a fixed connection to the middle shutter-closing blade 7b.

The slit-forming shutter blade 7a is provided with a leading or straight edge $7a_1$ that is maintained, during travel thereof, straight or normal relative to the medial plane normal thereto by a guide pin 8a in the arcuate groove 1b.

In this instance, the three sets of paired pins 6b, 8a and 6d, 8c and 6c, 8b are arranged with the corresponding pins of each set in parallel planes as illustrated in FIG. 1. Thus the levers, pins and blades form parallel link mechanisms as before described with respect to the shutter-opening group of blades.

After an exposure has been taken, the shutter-closing mechanism of the camera, not shown, is operated and pivotally rotates the pin 6a so that the main operating lever 6 is rotated in a clockwise direction actuating the shutter blades to the position illustrated in FIG. 2, thereby closing the aperture and terminating a photographic exposure being taken.

Those skilled in the art will recognize that the shutter blades are moved in parallel relationships and not pivotally as in those shutters where the blades are pivoted for rotation.

What we claim and desire to secure by Letters Patent is:

1. In a focal plane shutter, support means having a shutter aperture, a first plurality of shutter-opening blades closing the shutter when in a cocked condition, a first parallel link mechanism comprising two parallel link mechanism comprising two parallel links and said shutter-opening blades for supporting and operating the blades from a shutter-closing position to a shutter-opening position, a second plurality of shutter-closing blades disposed in a superposed relationship clear of said exposure aperture when said cocked condition exists and operable to a shutter-closing position closing the shutter aperture, a second parallel link mechanism comprising two parallel links and said shutter-closing blades for supporting and operating the shutter-closing blades, each of the first plurality of shutter-opening blades and said second plurality of shutter-closing blades having a slit-defining shutter blade having a straight edge for defining a slit of varying width as the shutter aperture is opened, and closed, each link mechanism comprising a rotationally driven main link and an auxiliary link parallel with a portion of said main link, each link mechanism haing a plate pivotally supporting the auxiliary link on a respective main link, each said plate mounting the slit-defining blade of its corresponding plurality of shutter blades on a corresponding auxiliary link, pivot means rotatably supporting the main link only of each link mechanism independently on said support means on a common side of said shutter aperture, a guide on each of the parallel links of each link mechanism for maintaining each respective straight edge of a corresponding slit-defining shutter blades in a plane normal to a medial plane passing through said aperture, and an arcuate slot on said support means within which said guide means are guided during travel of the slit-forming shutter blades.

2. In a focal plane shutter according to claim 1, in which the slit-forming shutter blade of each group of shutter blades is longer than the remainder of the blades within its respective groups.

3. In a focal plane shutter according to claim 1, in which the shutter blades are substantially rectangular.

* * * * *